3,634,489
SYNTHESIS OF CYCLOHEXENE COMPOUNDS
Gerhard Satzinger and Wolfgang Herrmann, Gundelfingen, Freiburg, Germany, assignors to Warner-Lambert Company, Morris Plains, N.J.
No Drawing. Filed Dec. 3, 1968, Ser. No. 780,882
Int. Cl. C07c 101/12
U.S. Cl. 260—471 R                               6 Claims

ABSTRACT OF THE DISCLOSURE

A process is described for producing a mixture of 3 - trans - dimethylamino-4-phenyl-4-trans-carbethoxy-Δ1-cyclohexene and 3-cis-dimethylamino-4-phenyl-4-cis-carbethoxy-Δ1-cyclohexene. The process comprises the step of reacting bis-(1,3-dimethylamino)-butene-(1) with the ethyl ester of atropic acid at a temperature within the range of from about 80° C. to about 150° C. in a liquid hydrocarbon.

The bis-(1,3-dimethylamino)-butene-(1) starting material can be produced by reacting dimethylamine and crotonaldehyde in a liquid hydrocarbon and in the presence of a water-absorbing agent, using a sufficient quantity of dimethylamine to provide a ratio of about 2.0 moles of the said amine for each mole of aldehyde employed.

BRIEF DESCRIPTION OF THE INVENTION

U.S. patent application Ser. No. 587,673, filed Oct. 19, 1966, now abandoned, discloses 3-trans-dimethylamino-4-phenyl - 4 - trans-carbethoxy-Δ1-cyclohexene and 3-cis-dimethylamino - 4 - phenyl-4-cis-carbethoxy-Δ1-cyclohexene and a method for producing same. The cyclohexene compounds are described in that application as having therapeutic activity, being useful and used as analgesics. In the preparative method which is disclosed in U.S. patent application Ser. No. 587,673, the ethyl ester of atropic acid is reacted with 1-dimethylamino-butadiene-(1,3) at room temperature, or at a temperature which is slightly elevated above room temperature, in the absence of a solvent. The product obtained by the prior art process is a mixture in which the cis- and trans-isomers are present in a ratio of about 3 to 1. Recently, however, the trans-isomer has been found to have greater analgesic activity than the cis-isomer and, hence, the trans-isomer is the product of choice. In view of this, the process disclosed in U.S. patent application Ser. No. 587,673 is not altogether commercially feasible since it tends to favor the production of the cis-isomer over the production of the trans-isomer.

The present invention provides an improved process for producing a mixture of 3-cis-dimethylamino-4-phenyl-4-cis-carbethoxy-Δ1-cyclohexene and 3-trans-dimethylamino-4-phenyl-4-trans-carbethoxy-Δ1-cyclohexene. The mixture obtained by the present method contains a proportion of trans-isomer which is higher than that contained in the mixture obtained by the prior art method. The process involves the condensation of bis-(1,3-dimethylamino)-butene-(1) with the ethyl ester of atropic acid, the reaction being effected in a liquid hydrocarbon, either aromatic or aliphatic in nature, at a temperature within the range of from about 80° C. to about 150° C.

The butene starting material can be produced by reacting dimethylamine and crotonaldehyde, in a molar ratio of 2.0 moles of said amine to 1.0 mole of said aldehyde, the reaction being carried out at a temperature within the range of from about −10° C. to about 35° C. in a liquid hydrocarbon, either aromatic or aliphatic in nature, in the presence of a suitable water-absorbing agent. The bis-(1,3-dimethylamino)-betene-(1), thus obtained, can be reacted, in situ, with the ethyl ester of atropic acid to obtain the desired mixture of isomers, or it can be isolated from the reaction mixture and subsequently reacted with the ethyl ester of atropic acid to obtain the isomeric mixture.

DETAILED DESCRIPTION

The process of the present invention involves the step of reacting, in a liquid hydrocarbon, bis-(1,3-dimethylamino)-butene-(1) and the ethyl ester of atropic acid, the reaction being carried out at a temperature within the range of from about 80° C. to about 150° C. In general, any liquid hydrocarbon, aromatic or aliphatic in nature, which has a boiling point of at least about 80° C. can be employed. Thus, for example, aromatic hydrocarbons, such as, benzene, toluene, xylene, etc., or aliphatic hydrocarbons, such as, mineral oil, can be used. In the preferred embodiment of the invention, the ethyl ester of atropic acid, dissolved in a liquid hydrocarbon, is, mixed with bis-(1,3-dimethylamino)-butene-(1), also dissolved in a liquid hydrocarbon, and the mixture is heated at reflux temperature until the reaction proceeds to completion.

In general, bis-(1,3-dimethylamino)-butene-(1), prepared by any appropriate method, can be employed in the process. In the preferred embodiment of the invention, however, the butene starting material is obtained by reacting dimethylamine with crotonaldehyde in a liquid hydrocarbon, either aromatic or aliphatic in nature, in the presence of a suitable water-absorbing agent. A sufficient quantity of dimethylamine is used to provide a ratio of 2.0 moles of said amine for each mole of crotonaldehyde present. The reaction is carried out at a temperature within the range of from about −10° C. to about 35° C. In general, any water-absorbing agent can be used in this step of the process. Especially well-suited for use, however, are potassium carbonate, calcium chloride, basic aluminum oxide or molecular sieves.

The bis-(1,3-dimethylamino)-butene-(1), produced by the method described in the preceding paragraph, is obtained in the form of a solution in the liquid hydrocarbon. If desired, the butene compound can be separated from the hydrocarbon by any appropriate method. The butene compound, so isolated, can be reacted subsequently with the ethyl ester of atropic acid in the manner heretofore described. In the preferred embodiment of the invention, however, the butene compound is not separated from the liquid hydrocarbon. Rather, the hydrocarbon solution of bis-(1,3-dimethylamino)-butene-(1) obtained by the method described herein, after the removal of the undissolved water absorbing agent, for example, by filtration, is mixed with the ethyl ester of atropic acid, also dissolved in a liquid hydrocarbon, and the mixture, thus obtained, is heated at a temperature within the range of from about 80° C. to about 150° C. until the reaction is complete.

The isomeric mixture which is obtained by the process of this invention can be recovered by any conventional method. In one such method, the reaction product, which is a solution of the isomeric mixture in the liquid hydrocarbon, is cooled to room temperature. The liquid hydrocarbon phase of the reaction mixture is extracted first with a dilute aqueous alkali, for example, a dilute aqueous sodium chloride solution, and then with a dilute mineral acid, for example, dilute hydrochloric acid. The acid phase is separated and it is treated with activated charcoal. The acid phase is, thereafter, filtered to remove the activated charcoal and the solution is made alkaline using some suitable alkali. The isomeric mixture which separates from the alkaline solution is recovered and it is taken up in a suitable solvent. An aliphatic hydrocarbon can be employed for this purpose. The solution is then dried, following which the solvent is removed, for example, by distillation.

Thus, in one of its embodiments, the present invention is concerned with a process for producing a mixture of 3-cis-dimethylamino-4-phenyl-4-cis-carbethoxy-Δ1-cyclohexene and 3-trans-dimethylamino-4-phenyl-4-trans-carbethoxy-Δ1-cyclohexene by thee reaction of bis-(1,3-dimethylamino)-butene-(1) with the ethyl ester of atropic acid under the conditions described herein. In a second embodiment, the invention comprises a two-step method for producing the aforementioned isomeric mixture, the first step in the process being the reaction of dimethylamine and crotonaldehyde, under the conditions described herein, to produce bis-(1,3-dimethylamino)-butene-(1) and the second step being the reaction of bis-(1,3-dimethylamino)-butene-(1), obtained in the first step, with the ethyl ester of atropic acid to obtain the mixture of 3-cis-dimethylamino-4-phenyl-4-cis-carbethoxy-Δ1-cyclohexene and 3-trans-dimethylamino-4-phenyl-4-trans-carbethoxy-Δ1-cyclohexene. The cis- and trans-isomers can be separately obtained from the mixture by prior methods, for example, by the method described in U.S. patent application Ser. No. 587,673.

The present invention provides a convenient and commercially practical means for producing mixtures of 3-cis-dimethylamino-4-phenyl-4-cis-carbethoxy-Δ1-cyclohexene and 3-trans-dimethylamino-4-phenyl-4-trans-carbethoxy-Δ1-cyclohexene. The process disclosed herein possesses significant advantages over the process disclosed in U.S. patent application Ser. No. 587,673. For example, the reaction of bis-(1,3-dimethylamino)-butene-(1) with the atropic acid ethyl ester is endothermic in nature, whereas, in the prior art method, the reaction of 1-dimethylamino butadiene-(1,3) with the same ester is exothermic. Thus, by utilizing the present method rather than the prior art method, the hazards and technical complications which are inherent in exothermic addition reactions are obviated. Furthermore, the process of the present invention yields mixtures which contain a greater proportion of the therapeutically more active trans-isomer. For example, the ratio of 3-cis-4-cis/3-trans-4-trans isomers present in the reaction product obtained by the process disclosed in U.S. patent application Ser. No. 587,673 was about 3:1. In the present process, the 3-cis-4-cis/3-trans-4-trans isomers are present in the reaction product in a ratio of about 1.5 to 1. The present invention, therefore, provides a process in which increased yields of the more active 3-trans-dimethylamino-4-phenyl-4-trans-carbethoxy-Δ1-cyclohexene are obtained.

For a fuller understanding of the nature and objects of this invention, reference may be had to the following examples, which are given merely as further illustrations of the invention, and are not to be construed in a limited sense.

Example I (A) In this example, 30.0 liters of toluene were introduced into a reaction vessel of 100 liters capacity and 15.75 kg. (114 moles) of potassium carbonate were added thereto, with stirring. The mixture was brought to a temperature within the range of from about −5° C. to about −10° C. and, at that temperature, 13.5 kg. (300 moles) of dimethylamine were added, without stirring. The mixture was continuously cooled to maintain its temperature within the range of from about −5° C. to about −10° C. and 11.5 kg. (150 moles) of crotonaldehyde, dissolved in 10 liters of toluene, were added slowly thereto. During the addition, the internal temperature of the reaction mixture was maintained at about −3° C. to −8° C. When the reaction was complete, the reaction mixture was filtered to remove the insoluble potassium carbonate, and then washed with 20 liters of toluene. The product, thus obtained, was a solution of bis-(1,3-dimethylamino)-butene-(1) in toluene.

(B) In a separate reaction vessel, 25.1 kg. (142.5 moles) of atropic acid ethyl ester, dissolved in 75 liters of toluene, was heated at reflux temperature, with stirring. The solution of bis-(1,3-dimethylamino)-butene-(1), obtained as described in paragraph (A) of this example, was added to the refluxing toluene solution of atropic acid ethyl ester. The reaction mixture was heated at reflux temperature for a period of about 90 minutes. At the end of that period of time, the reaction mixture was cooled. Thereafter, the toluene phase was extracted, first with a 10% sodium chloride solution and subsequently with a 10% hydrochloric acid solution. The hydrochloric acid solution phase was separated and it was treated with activated charcoal and filtered. The acid solution was then made alkaline by the addition of aqueous ammonia. The isomeric mixture separated from alkaline solution and the mixture was taken up in gasoline. The solution was dried, following which the solvent was removed by distillation.

There was, thus obtained, 27.4 kg. (corresponding to 70.5% of theory) of a mixture of 3-cis-dimethylamino-4-phenyl-4-cis-carbethoxy-Δ1-cyclohexene and 3-trans-dimethylamino-4-phenyl-4-trans-carbethoxy-Δ1-cyclohexene. It was found by gas liquid chromatography that the ratio of 3-cis-4-cis/3-trans-4-trans isomers in the mixture was 1.37 to 1.

Example II (A) In this example, a mixture of 9.0 grams (0.2 mole) of dimethylamine, 50 ml. of xylene and 10.0 grams of basic aluminum oxide (activity Grade I according to Brockmann) was prepared. This mixture was brought to a temperature within the range of from about 20° C. to about 35° C., and a solution of 7 grams (0.1 mole) of crotonaldehyde in 30 ml. of xylene was added thereto. The reaction mixture was allowed to stand at room temperature for a period of about two hours, following which it was filtered to remove the insoluble basic aluminum oxide. The product, thus obtained, was a solution of bis-(1,3-dimethylamino)-butene-(1) in xylene.

(B) A solution of 17.6 grams (0.1 mole) of atropic acid ethyl ester in 50 ml. of xylene was prepared and heated to reflux temperature. The solution of bis-(1,3-dimethylamino)-butene-(1), produced as described in paragraph (A) of this example, was added to the refluxing solution of atropic acid ethyl ester slowly over a period of about 5 minutes. When the addition was complete, the reaction mixture was heated at reflux temperature for a period of about 10 minutes. The product, thus obtained, was worked-up in the manner described in Example I, to obtain 20.0 grams (corresponding to 73% of theory) of a mixture containing 3-cis-dimethylamino-4-phenyl-4-cis-carbethoxy-Δ1-cyclohexene and 3-trans-dimethylamino-4-phenyl-4-trans-carbethoxy-Δ1-cyclohexene. It was found by gas liquid chromatography that the mixture contained the 3-cis-4-cis/3-trans-4-trans isomers in a ratio of about 1.46 to 1.

Example III (A) In this example, 9.0 grams (0.2 mole) of dimethylamine were dissolved in 100 ml. of an aliphatic hydrocarbon and the solution was cooled to a temperature of about 0° C. The hydrocarbon used was Shell Crystal Oil 21 having a boiling point of from about 130° C. to about 180° C. While the dimethylamine solution was maintained at a temperature of about 0° C., 10.5 grams (0.075 mole) of dry potassium carbonate was added. To the mixture, thus obtained, there was added, at a temperature of about 0° C., a solution of 7 grams (0.1 mole) of crotonaldehyde in 10 ml. of Shell Crystal Oil 21. The temperature of the reaction mixture was allowed to reach room temperature, and, at room temperature, the mixture was allowed to stand for about one hour. At the end of that period of time, the undissolved potassium carbonate was removed by filtration. The product, thus obtained, was an aliphatic hydrocarbon solution of bis-(1,3-dimethylamino)-butene-(1).

(B) 17.6 grams (0.1 mole) of atropic acid ethyl ester were dissolved in 60 ml. of Shell Crystal Oil 21 and the solution was heated to its reflux temperature. Over a period of about 10 minutes, the solution, produced as described in paragraph (A) of this example, was added to the refluxing aliphatic hydrocarbon solution of atropic acid ethyl ester. The mixture was then heated at reflux temperature for a period of about 30 minutes. At the end of that period of time, the reaction mixture was worked-up, by the procedure described in Example I, to obtain 20.0 grams (corresponding to 73% of theory) of a mixture of 3-cis-dimethylamino4-phenyl-4-cis-carbethoxy-Δ1-cyclohexene and 3-trans-dimethylamino-4-phenyl-4-trans-carbethoxy-Δ1-cyclohexene. By means of gas liquid chromatography it was found that the ratio of 3-cis-4-cis/3-trans-4-trans isomers present in the mixture was 1.53 to 1.

Having described our invention, what we desire to secure by Letters Patent is:

1. A process for producing a mixture of 3-trans-dimethylamino - 4 - phenyl-4-trans-carbethoxy-Δ1-cyclohexene and 3 - cis - dimethylamino-4-phenyl-4-cis-carbethoxy-Δ1-cyclohexene which comprises heating bis-(1,3-dimethyl amino)-butene-(1) and the ethyl ester of atropic acid at a temperature within the range of 80° C. to 150° C. in a liquid hydrocarbon having a boiling point of at least 80° C.

2. The process of claim 6 wherein the liquid hydrocarbon employed is a liquid aliphatic hydrocarbon.

3. The process of claim 1 wherein the liquid hydrocarbon employed is a liquid aromatic hydrocarbon.

4. The process of claim 2 wherein the liquid aliphatic hydrocarbon employed has a boiling point within the range of from 130° C. to 180° C.

5. The process of claim 3 wherein the liquid aromatic hydrocarbon employed is toluene.

6. The process of claim 3 wherein the liquid aromatic hydrocarbon employed is xylene.

References Cited

Langenbeck et al.: Ber. 75, pp. 232–6 (1942).

LORRAINE A. WEINBERGER, Primary Examiner

E. JAY GLEIMAN, Assistant Examiner

U.S. Cl. X.R.

260—583 H, 999